US012304301B2

(12) United States Patent
Imai et al.

(10) Patent No.: US 12,304,301 B2
(45) Date of Patent: May 20, 2025

(54) IN-WHEEL MOTOR DRIVE DEVICE MOUNTED ON MOTOR VEHICLE

(71) Applicant: TOYOTA JIDOSHA KABUSHIKI KAISHA, Toyota (JP)

(72) Inventors: Keita Imai, Seto (JP); Kiichi Yokoyama, Toyota (JP); Hiroki Monji, Toyota (JP); Yusuke Ueta, Shizuoka-ken (JP); Tatsuya Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/497,259

(22) Filed: Oct. 30, 2023

(65) Prior Publication Data

US 2024/0239187 A1 Jul. 18, 2024

(30) Foreign Application Priority Data

Jan. 18, 2023 (JP) .................................. 2023-006014

(51) Int. Cl.
| | |
|---|---|
| *B60K 17/04* | (2006.01) |
| *B60K 7/00* | (2006.01) |
| *F16H 1/08* | (2006.01) |
| *F16H 57/02* | (2012.01) |

(52) U.S. Cl.
CPC .......... *B60K 17/043* (2013.01); *B60K 7/0007* (2013.01); *F16H 1/08* (2013.01); *F16H 57/02* (2013.01); F16H 2057/02034 (2013.01)

(58) Field of Classification Search
CPC ..... B60K 17/043; B60K 7/0007; F16H 1/008; F16H 57/02; F16H 57/021; F16H 57/03; F16H 2057/02008; F16H 2057/02034; F16H 2057/02091
See application file for complete search history.

(56) References Cited

U.S. PATENT DOCUMENTS

| | | | | |
|---|---|---|---|---|
| 11,662,010 B2* | 5/2023 | Yukishima | ............ | F16H 57/021 74/462 |
| 2021/0190192 A1* | 6/2021 | Yukishima | .............. | F16H 55/08 |

FOREIGN PATENT DOCUMENTS

| | | | | |
|---|---|---|---|---|
| CN | 111758205 | A | * | 10/2020 |
| JP | 2017065301 | A | * | 4/2017 |
| JP | 2019-018735 | A | | 2/2019 |
| JP | 6819495 | B2 | * | 1/2021 |
| JP | 2021075203 | A | * | 5/2021 |
| WO | WO-2022246054 | A1 | * | 11/2022 |

* cited by examiner

*Primary Examiner* — Bobby Rushing, Jr.
(74) *Attorney, Agent, or Firm* — SoraIP, Inc.

(57) ABSTRACT

A gear case of an in-wheel motor drive device houses first and second helical gears, has a first opening in its inner wall through which a motor main shaft passes, and has a second opening in its outer wall through which an axle passes. The in-wheel motor drive device further includes a first thrust bearing attached to the outer wall and supporting the first helical gear, and a second thrust bearing attached to the inner wall and supporting the second helical gear. The directions of helical teeth of the first and second helical gears are set so that when a motor vehicle travels forward, a thrust load directed outward in the vehicle width direction is applied to the first helical gear, and a thrust load directed toward the middle in the vehicle width direction is applied to the second helical gear.

3 Claims, 3 Drawing Sheets

IN-WHEEL MOTOR DRIVE DEVICE MOUNTED ON MOTOR VEHICLE

CROSS-REFERENCE TO RELATED APPLICATION

This application claims priority to Japanese Patent Application No. 2023-006014 filed on Jan. 18, 2023, incorporated herein by reference in its entirety.

BACKGROUND

1. Technical Field

The technique disclosed in the present specification relates to in-wheel motor drive devices mounted on motor vehicles.

2. Description of Related Art

Japanese Unexamined Patent Application Publication No. 2019-018735 (JP 2019-018735 A) discloses an example of an in-wheel motor drive device. In the in-wheel motor drive device, a motor main shaft and an axle connected to a wheel are parallel, and helical gears are fixed to the motor main shaft and the axle. The helical gear for the motor main shaft and the helical gear for the axle are engaged, so that the torque of the motor main shaft is transmitted to the axle. The axle is rotatably supported by a case via a cylindrical roller bearing and a ball bearing. The cylindrical roller bearing supports a load in a radial direction, and the ball bearing support a load in a thrust direction. Helical gears are known to generate a large load in the thrust direction (thrust load).

SUMMARY

Thrust loads applied to a first helical gear (helical gear for the motor main shaft) and a second helical gear (helical gear for the axle) are received by a gear case via thrust bearings. Increasing the wall thickness of the entire gear case so that the gear case can sufficiently withstand the thrust loads increases the weight. Reducing the wall thickness of the entire gear case may result in deformation of the gear case due to the thrust loads. The present specification provides a technique that can withstand thrust loads generated on helical gears and that also reduces an increase in weight of a gear case.

An in-wheel motor drive device disclosed in the present specification includes: a motor case that houses a motor; and a gear case that is in contact with an outer side in a vehicle width direction of the motor case and houses a first helical gear and a second helical gear. The first helical gear is fixed to a motor main shaft. The second helical gear is fixed to an axle. The axle is parallel to the motor main shaft, and the second helical gear is engaged with the first helical gear. The gear case is in contact with the motor case, has a first opening in a wall (inner wall) of the gear case that faces the motor case, and has a second opening in a wall (outer wall) of the gear case that is located on an outer side in the vehicle width direction, the motor main shaft (or a shaft of the first helical gear) passing through the first opening, and the axle passing through the second opening. The in-wheel motor drive device further includes a first thrust bearing and a second thrust bearing. The first thrust bearing is attached to the outer wall of the gear case, and is configured to rotatably support the first helical gear. The second thrust bearing is attached to the inner wall of the gear case, and is configured to rotatably support the second helical gear. The first thrust bearing may be configured to rotatably support the first helical gear via the motor main shaft, and the second thrust bearing may be configured to rotatably support the second helical gear via the axle. Directions of helical teeth of the first helical gear and the second helical gear are set in such a manner that when the motor main shaft is rotating in a direction in which a motor vehicle travels forward, a thrust load directed outward in the vehicle width direction is applied to the first helical gear, and a thrust load directed toward a middle in the vehicle width direction is applied to the second helical gear.

The inner wall of the gear case has the first opening that extends along the motor main shaft and through which the motor main shaft (or the shaft of the first helical gear) passes. Therefore, this part of the inner wall of the gear case has low strength. However, the outer wall of the gear case does not have an opening at a position facing the first helical gear. Therefore, this part of the outer wall of the gear case has high strength. When the motor vehicle travels forward, a thrust load generated on the first helical gear is directed outward in the vehicle width direction, and the part of the outer wall of the gear case that has high strength receives the thrust load via the first thrust bearing. The outer wall of the gear case has the second opening that extends along the axle and through which the axle passes. Therefore, this part of the outer wall of the gear case has low strength. However, the inner wall of the gear case does not have an opening at a position facing the second helical gear. Therefore, this part of the inner wall of the gear case has high strength. When the motor vehicle travels forward, the thrust load generated on the second helical gear is directed toward the middle in the vehicle width direction, and the part of the inner wall of the gear case that has high strength receives the thrust load via the second thrust bearing. The parts of the gear case that do not have an opening can firmly receive the thrust loads. Moreover, since a high thrust load is not generated near the first and second openings of the gear case, it is not necessary to increase the thickness of those parts of the gear case. The in-wheel motor drive device disclosed in the present specification can firmly withstand the thrust loads generated on the helical gears, and can also reduce an increase in weight of the gear case.

A rib may be located on a back surface of an outer wall in the vehicle width direction of the motor case. The rib may be placed so as to overlap the axle as viewed in an axial direction of the axle. The rib on the motor case supports part of the thrust load applied to the second helical gear when the motor vehicle travels forward. Therefore, the thrust load generated on the second helical gear can be firmly received even when the thickness of the inner wall of the gear case (or the outer wall of the motor case) is reduced.

Alternatively, a peripheral wall of the motor case that is parallel to the motor main shaft may overlap the axle as viewed in an axial direction of the axle. The peripheral wall of the motor case supports part of the thrust load applied to the second helical gear when the motor vehicle travels forward. Therefore, the thrust load generated on the second helical gear can be firmly received even when the thickness of the outer wall of the motor case (or the inner wall of the gear case) is reduced.

In the in-wheel motor drive device disclosed in the present specification, the thrust loads generated when the motor main shaft rotates in the direction in which the motor vehicle travels forward are received by the walls of the gear case that have no opening. Details of the technique disclosed in the present specification and further modifications in the technique will be described in "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

The in-wheel motor drive device 2 of the first embodiment will be described with reference to FIGS. 1 to 3. In order to simplify the description, the in-wheel motor drive device 2 may be simply referred to as the drive device 2 below. The drive device 2 is mounted on a motor vehicle 90. The motor vehicle 90 is a kind of battery electric vehicle because the motor vehicle 90 is driven by the drive device 2 including the electric motor. The motor vehicle 90 uses the drive devices 2 for all four wheels. Since the four drive devices 2 have the same structure, one drive device 2 will be described below.

Figure 1:
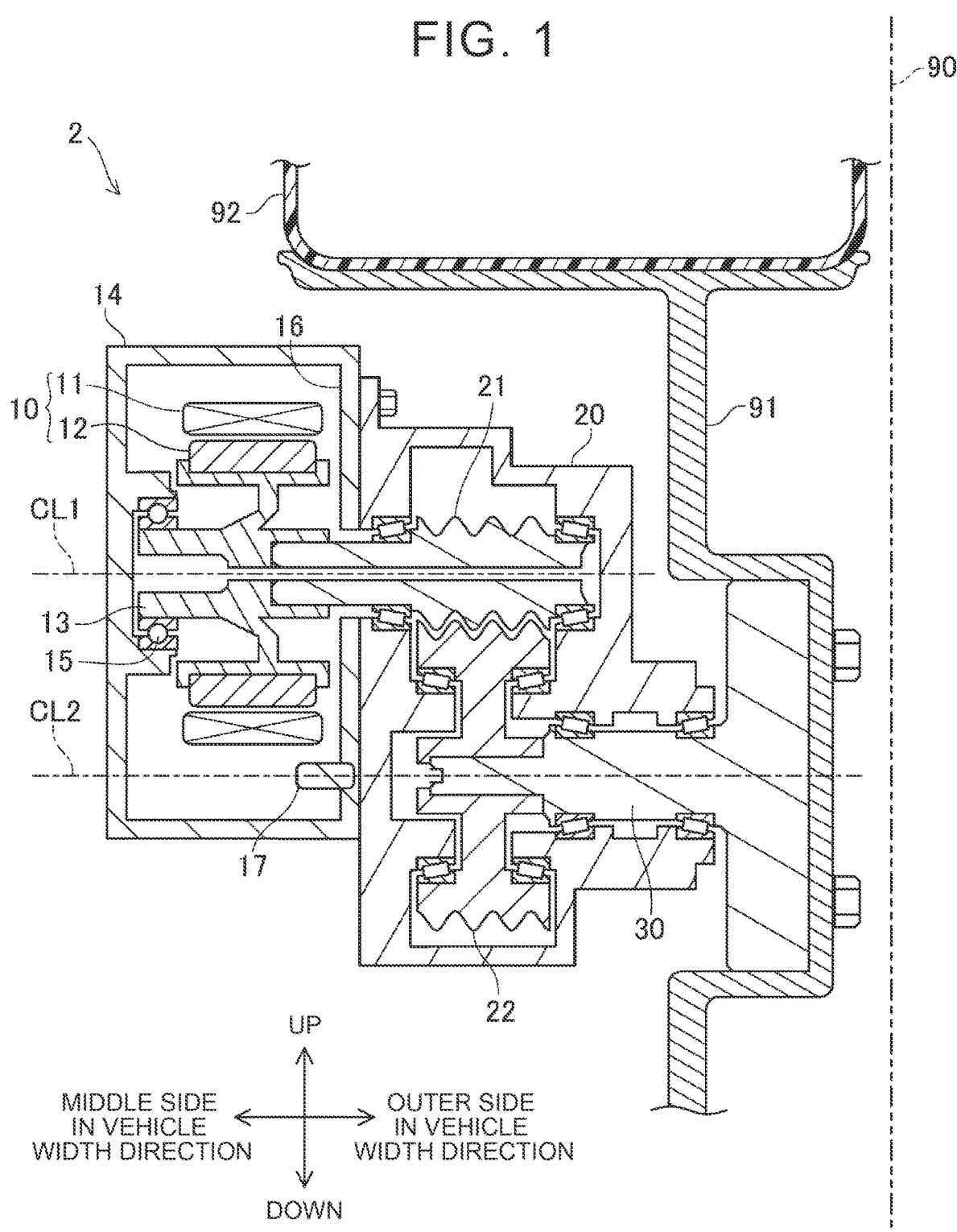
FIG. 1 is a cross-sectional view of the in-wheel drive device of the first embodiment.

FIG. 1 shows a sectional view of the drive device 2. The upper side of FIG. 1 corresponds to the vertically upward direction, and the lower side corresponds to the vertically downward direction. The left-right direction in FIG. 1 corresponds to the vehicle width direction of the motor vehicle 90. Although the motor vehicle 90 has a drive device 2 for each wheel, FIG. 1 shows a section of the drive device 2 in the right front part of the motor vehicle 90. The right side of FIG. 1 corresponds to the outside of the motor vehicle 90 in the vehicle width direction, and the left side of FIG. 1 corresponds to the inside of the motor vehicle 90 in the vehicle width direction. In this embodiment, the term "inner side in the vehicle width direction" means the side closer to the middle of the motor vehicle 90. The "outer side in the vehicle width direction" may be expressed as "the side closer to the wheel 91".

The drive device 2 has a motor 10 and an axle 30. Motor 10 includes stator 11 and rotor 12, which are housed in motor case 14. The stator 11 is fixed to the motor case 14. The rotor 12 includes a motor main shaft 13, and the motor main shaft 13 (rotor 12) is rotatably supported by the motor case 14 via ball bearings 15. A rib 17 is provided on the inner surface of the outer wall (outer wall 16) of the motor case 14 in the vehicle width direction. Effects of the rib 17 will be described later.

Axle 30 is parallel to motor main shaft 13. A dashed-dotted line CL1 in FIG. 1 represents the axis of the motor main shaft 13, and a dashed-dotted line CL2 represents the axis of the axle 30. A first helical gear 21 is fixed to the motor main shaft 13, and a second helical gear 22 is fixed to the axle 30. A wheel 91 is connected to the outer end of the axle 30 in the vehicle width direction, and a tire 92 is fitted to the wheel 91.

The second helical gear 22 engages the first helical gear 21 and the torque of the motor 10 is transmitted to the wheel 91 via the first and second helical gears 21, 22. In other words, the rotation of the motor main shaft 13 is transmitted to the wheel 91 via the first and second helical gears 21, 22. The motor main shaft 13 including the shaft of the first helical gear 21 extends outside the motor case 14 along the vehicle width direction.

The first and second helical gears 21, 22 are housed in the gear case 20. The gear case 20 is in contact with the motor case 14. More specifically, gear case 20 is fixed to outer wall 16 of motor case 14. The gear case 20 is supported by suspension arms (not shown). That is, the gear case 20 (drive device 2) is supported by the vehicle body of the motor vehicle 90 via suspension arms (not shown).

Figure 2:
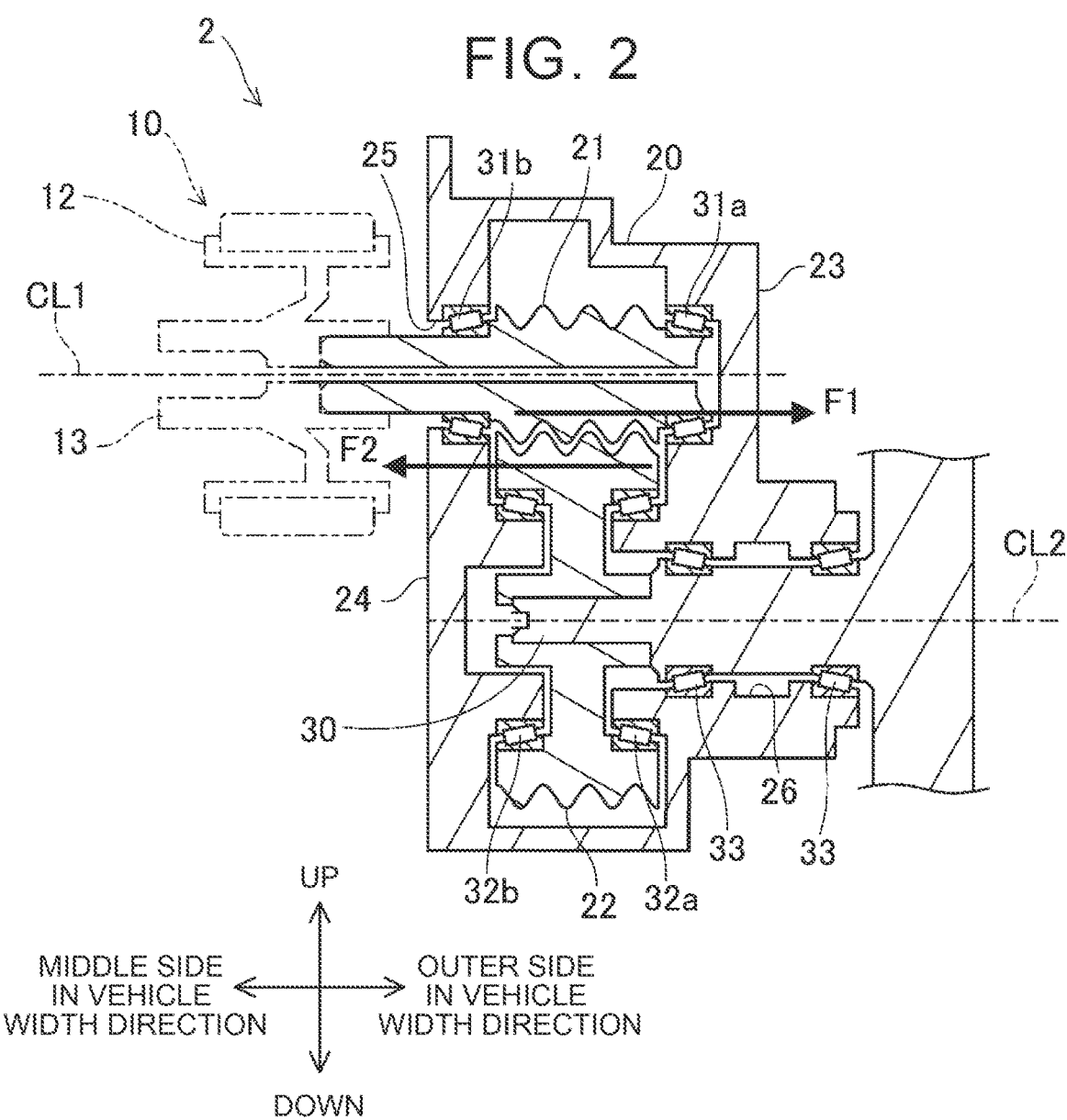
FIG. 2 is a cross-sectional view of the in-wheel drive device of the first embodiment (illustration of some parts is omitted)
Figure 3:
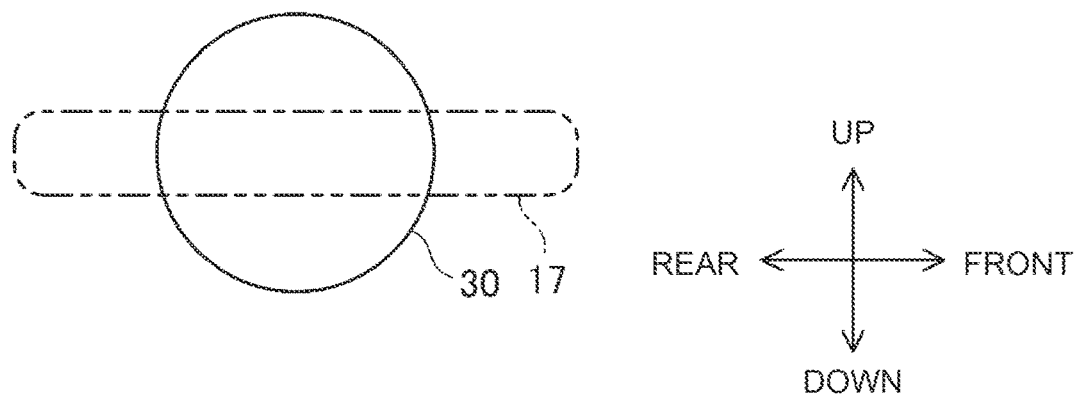
FIG. 3 is a diagram showing the positional relationship between the rib and the axle when viewed from the direction along the axle.

FIG. 2 shows a cross section of the drive device 2 with some parts omitted. A detailed structure of the drive device 2 will be described with reference to FIG. 2.

The first helical gear 21 is fixed to the motor main shaft 13 and rotatably supported by the gear case 20 by a pair of first thrust bearings 31a, 31b. The first thrust bearing 31a is attached to the outer wall 23 of the gear case 20, and the first thrust bearing 31b is attached to the inner wall 24 of the gear case 20. Here, the outer wall 23 (inner wall 24) refers to the outer wall (center side) of the gear case 20 in the vehicle width direction.

The second helical gear 22 is fixed to the axle 30 and rotatably supported by the gear case 20 by a pair of second thrust bearings 32a, 32b. The second thrust bearing 32a is attached to the outer wall 23 and the second thrust bearing 32b is attached to the inner wall 24. The axle 30 is rotatably supported by the gear case 20 through a pair of third thrust bearings 33.

The gear case 20 has a first opening 25 and a second opening 26. The first opening 25 is provided in the inner wall 24 of the gear case 20, through which the motor main shaft 13 (the shaft of the first helical gear 21) passes. The second opening 26 is provided in the outer wall 23 of the gear case 20, through which the axle 30 (the axis of the second helical gear 22) passes.

The first thrust bearings 31a, 31b determine the thrust and radial positions of the first helical gear 21. In other words, the first thrust bearings 31a, 31b receive loads applied to the first helical gear 21 in the thrust direction and the radial direction. The second thrust bearings 32a, 32b determine the thrust and radial positions of the second helical gear 22. In other words, the second thrust bearings 32a, 32b receive loads applied to the second helical gear 22 in the thrust and radial directions. The same applies to the third thrust bearing 33.

Thrust ball bearings, thrust angular contact ball bearings, thrust cylindrical roller bearings, thrust needle bearings, thrust tapered roller bearings, and thrust self-aligning roller bearings are known as typical thrust bearings. FIGS. 1 and 2, the first and second thrust bearings 31, 32 are depicted as self-aligning thrust roller bearings, but may be other types of thrust bearings.

As is well known, helical gears have tooth surfaces that are not parallel to the gear axis but are inclined. Therefore, when two helical gears engage and transmit power, a strong thrust load is generated on both helical gears. A thrust bearing is used to support the helical gear in order to maintain the axial position of the helical gear against this strong thrust load.

The first helical gear 21 and the second helical gear 22 are determined so that the direction of the helical teeth (inclination of the tooth surface with respect to the axis) satisfies the following conditions. That is, the direction of the helical teeth is determined so that when the motor main shaft 13 is rotating in the direction in which the motor vehicle 90 travels forward, the first helical gear 21 is subjected to a thrust load directed outward in the vehicle width direction, and the second helical gear 22 is subjected to a thrust load directed inward (toward the middle) in the vehicle width direction. In other words, when the motor main shaft 13 is rotating in the direction in which the motor vehicle 90 travels forward, the tooth surfaces of the second helical gear 22 that are located on the outer side in the vehicle width direction contact the tooth surfaces of the first helical gear 21 that are located closer to the middle in the vehicle width direction.

For convenience of explanation, the rotation of the motor main shaft 13 in the direction in which the motor vehicle 90 travels forward is referred to as "forward rotation." The thick arrow line F1 in FIG. 2 indicates the thrust load applied to the first helical gear 21 during forward rotation of the motor main shaft, and the thick arrow line F2 indicates the thrust load applied to the second helical gear 22 during forward rotation. The thrust load generated on the first helical gear 21 and the thrust load generated on the second helical gear 22 have the same absolute value and are directed in opposite directions.

A first thrust bearing 31 rotatably supports both sides of the first helical gear 21 in the vehicle width direction. Since the thrust load (thick arrow line F1) during forward rotation is directed outward in the vehicle width direction, the thrust load concentrates on the first thrust bearing 31a arranged on the outer side of the first helical gear 21 in the vehicle width direction. The first thrust bearing 31a is supported by the outer wall 23. Since the portion of the outer wall 23 facing the first helical gear 21 is not provided with an opening, the strength of this portion is higher than that of the inner wall 24 on the opposite side. A portion of the outer wall 23 without an opening firmly receives the thrust load generated in the first helical gear 21 during forward rotation. On the other hand, since the first opening 25 is provided in the portion of the inner wall 24 facing the first helical gear 21, the strength around the first opening 25 (compared to the outer wall 23 on the opposite side) is low. However, a high thrust load is not applied around the first opening 25. Since it is not necessary to increase the strength of the inner wall 24 around the first opening 25, an increase in the weight of the gear case 20 can be suppressed.

The same applies to the thrust load that occurs on the second helical gear 22. The thrust load generated in the second helical gear 22 during forward rotation is directed toward the middle in the vehicle width direction. The thrust load concentrates on the second thrust bearing 32b located on a part of the second helical gear 22 that is located closer to the middle in the vehicle width direction. The second thrust bearing 32b is supported by the inner wall 24. Since the portion of the inner wall 24 facing the second helical gear 22 is not provided with an opening, the strength of this portion is higher than the portion of the outer wall 23 on the opposite side. A portion of the inner wall 24 without an opening firmly receives the thrust load generated in the second helical gear 22 during forward rotation. On the other hand, since the second opening 26 is provided in the portion of the outer wall 23 facing the second helical gear 22, the strength around the second opening 26 (compared to the inner wall 24 on the opposite side) is low. However, no high thrust load is applied around the second opening 26. Since it is not necessary to increase the strength of the outer wall 23 around the second opening 26, an increase in the weight of the gear case 20 (drive device 2) can be suppressed.

A rib 17 is provided on the rear surface of the outer wall 16 of the motor case 14 (see FIG. 1). Arrangement of the rib 17 and the axle 30 will be described. FIG. 3 shows the positional relationship between the rib 17 and the axle 30 when viewed from the axial direction of the axle 30. As shown in FIG. 3, the rib 17 overlaps the axle 30 when viewed from the axial direction of the axle 30. Part of the thrust load acting on the second helical gear 22 is supported by the rib 17 of the motor case 14. Even if the thickness of the outer wall 16 of the motor case 14 (or the inner wall 24 of the gear case 20) is reduced, the rib 17 firmly receives the thrust load generated in the second helical gear 22 during forward rotation.

Second Embodiment

Figure 4:
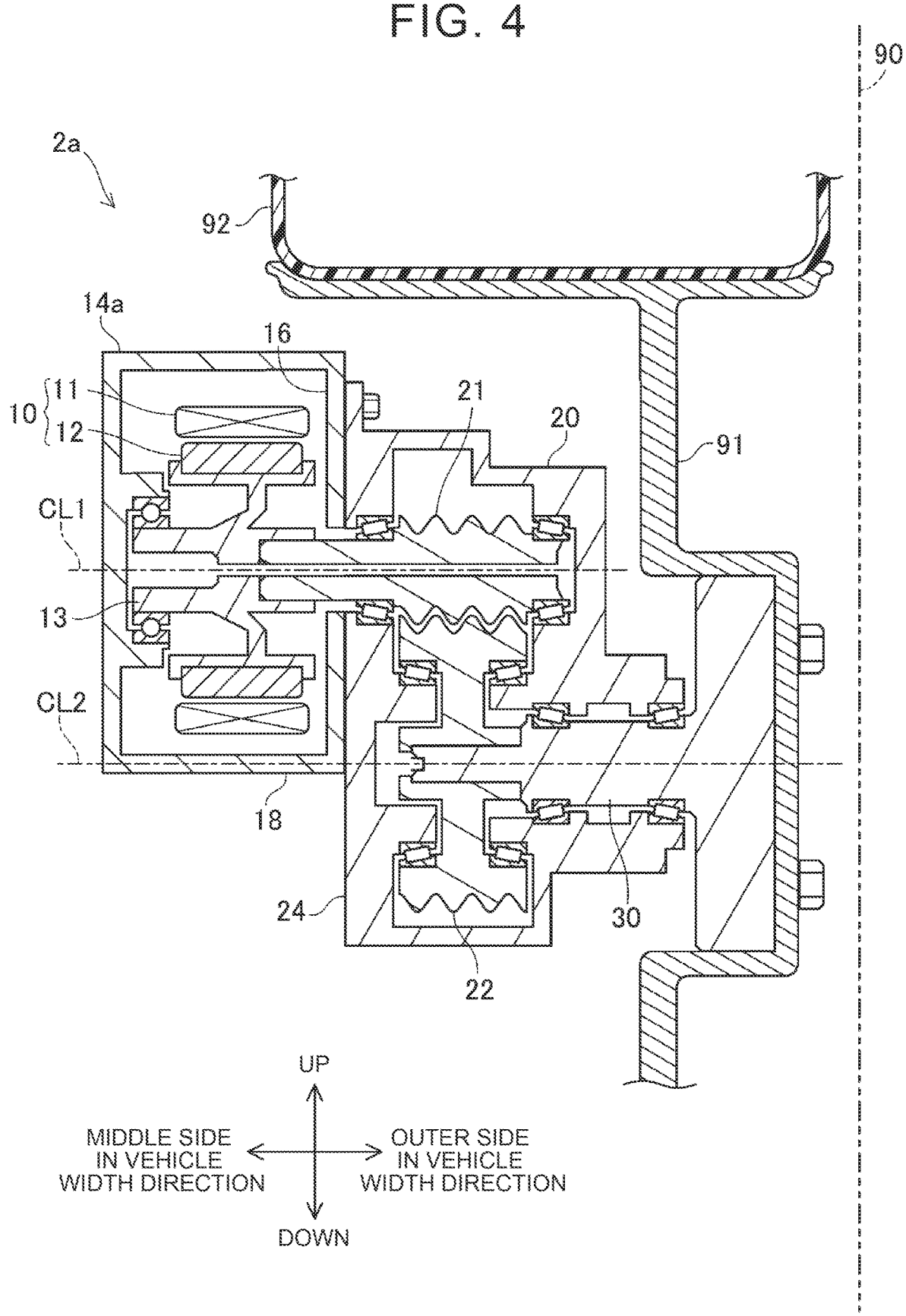
FIG. 4 is a cross-sectional view of the in-wheel drive device of the second embodiment.

FIG. 4 shows a sectional view of a drive device 2a of the second embodiment. The drive device 2a differs from the drive device 2 of the first embodiment in the shape of the motor case 14a. Except for the shape of the motor case 14a, the structure of the drive device 2a is the same as that of the drive device 2 of the first embodiment.

The motor case 14a has an outer diameter smaller than that of the motor case 14 of the drive device 2 of the first embodiment. A peripheral wall 18 that is a wall of the motor case 14a and parallel to the motor main shaft 13 is positioned so as to overlap the axle 30 when viewed from the axial direction of the axle 30. In FIG. 4, the axis CL2 of the axle 30 passes through the peripheral wall 18. With this configuration, part of the thrust load acting on the second helical gear 22 is supported by the peripheral wall 18 of the motor case 14a. Even if the thickness of the outer wall 16 of the motor case (or the inner wall 24 of the gear case 20) is reduced, the peripheral wall 18 firmly receives the thrust load generated in the second helical gear 22.

As described above, the drive device 2 (2a) of the embodiment can firmly withstand the thrust load generated in the helical gear, and also suppress the increase in weight of the gear case 20 (drive devices 2, 2a). The drive device 2 (2a) can firmly receive the thrust load generated in the helical gears 21 and 22 particularly when the motor vehicle 90 travels forward (when the motor main shaft 13 rotates forward).

Points to be noted regarding the technique described in the embodiment will be described. A pair of first thrust bearings 31a, 31b is arranged on both sides of the first helical gear 21. The first thrust bearing 31a is fixed to the outer wall 23 of the gear case 20, and rotatably supports the first helical gear 21 at a position on the outer side in the vehicle width direction of the first helical gear 21. A thrust load generated on the first helical gear 21 during forward rotation is firmly received by the outer wall 23 via the first thrust bearing 31a. A pair of second thrust bearings 32a, 32b is arranged on opposite sides of the second helical gear 22. The second thrust bearing 32b is fixed to the inner wall 24 of the gear case 20, and rotatably supports the second helical gear 22 at a position on the inner side (closer to the middle) in the vehicle width direction of the second helical gear 22. A thrust load generated on the second helical gear 22 during forward rotation is firmly received by the inner wall 24 via the second thrust bearing 32b.

The technique described in the examples may be expressed as follows. That is, this specification discloses the motor vehicle 90 equipped with an in-wheel motor drive device 2 (2a). The motor vehicle 90 includes the in-wheel motor drive device 2 (2a) described in the embodiment.

Although the specific examples have been described in detail above, these are merely examples and do not limit the scope of claims. The techniques described in the claims include various modifications and alternations of the specific example illustrated above. The technical elements described in the present specification or the drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. An in-wheel motor drive device mounted on a motor vehicle, the in-wheel motor drive device comprising:
    a motor case that houses a motor, the motor including a motor main shaft;
    an axle parallel to the motor main shaft with a wheel fixed to an outer end of the axle in a vehicle width direction of the motor vehicle;
    a first helical gear fixed to the motor main shaft;
    a second helical gear fixed to the axle and engaged with the first helical gear;
    a gear case that is in contact with the motor case, houses the first helical gear and the second helical gear, has a first opening in an inner wall of the gear case that faces the motor case, and has a second opening in an outer wall of the gear case that is located on an outer side in the vehicle width direction, the motor main shaft passing through the first opening, and the axle passing through the second opening;
    a pair of first thrust bearings, the pair of first thrust bearings including a first outer thrust bearing that is attached to the outer wall of the gear case and a first inner thrust bearing that is attached to the inner wall of the gear case, and the pair of first thrust bearings being configured to rotatably support the first helical gear; and
    a pair of second thrust bearings, the pair of second thrust bearings including a second outer thrust bearing that is attached to the outer wall of the gear case and a second inner thrust bearing that is attached to the inner wall of the gear case, and the pair of second thrust bearings being configured to rotatably support the second helical gear, wherein
    an outer end of the first helical gear is supported by the outer wall via the first outer thrust bearing, and an inner end of the first helical gear is supported by the inner wall via the first inner thrust bearing at the first opening,
    an inner end of the second helical gear is supported by the inner wall via the second inner thrust bearing, and an outer end of the second helical gear is supported by the outer wall via the second outer thrust bearing at the second opening,
    directions of helical teeth of the first helical gear and the second helical gear are set in such a manner that when the motor main shaft is rotating in a direction in which the motor vehicle travels forward, a first thrust load directed outward in the vehicle width direction is applied to the first helical gear such that the outer wall receives the first thrust load, and a second thrust load directed toward a middle in the vehicle width direction is applied to the second helical gear such that the inner wall receives the second thrust load, and
    the first thrust load and the second thrust load have a same absolute value and are directed in opposite directions.

2. The in-wheel motor drive device according to claim 1, wherein:
    a rib is located on a back surface of an outer wall in the vehicle width direction of the motor case; and
    the rib overlaps the axle as viewed in an axial direction of the axle.

3. The in-wheel motor drive device according to claim 1, wherein a peripheral wall of the motor case that is parallel to the motor main shaft overlaps the axle as viewed in an axial direction of the axle.

* * * * *